Patented Dec. 9, 1924.

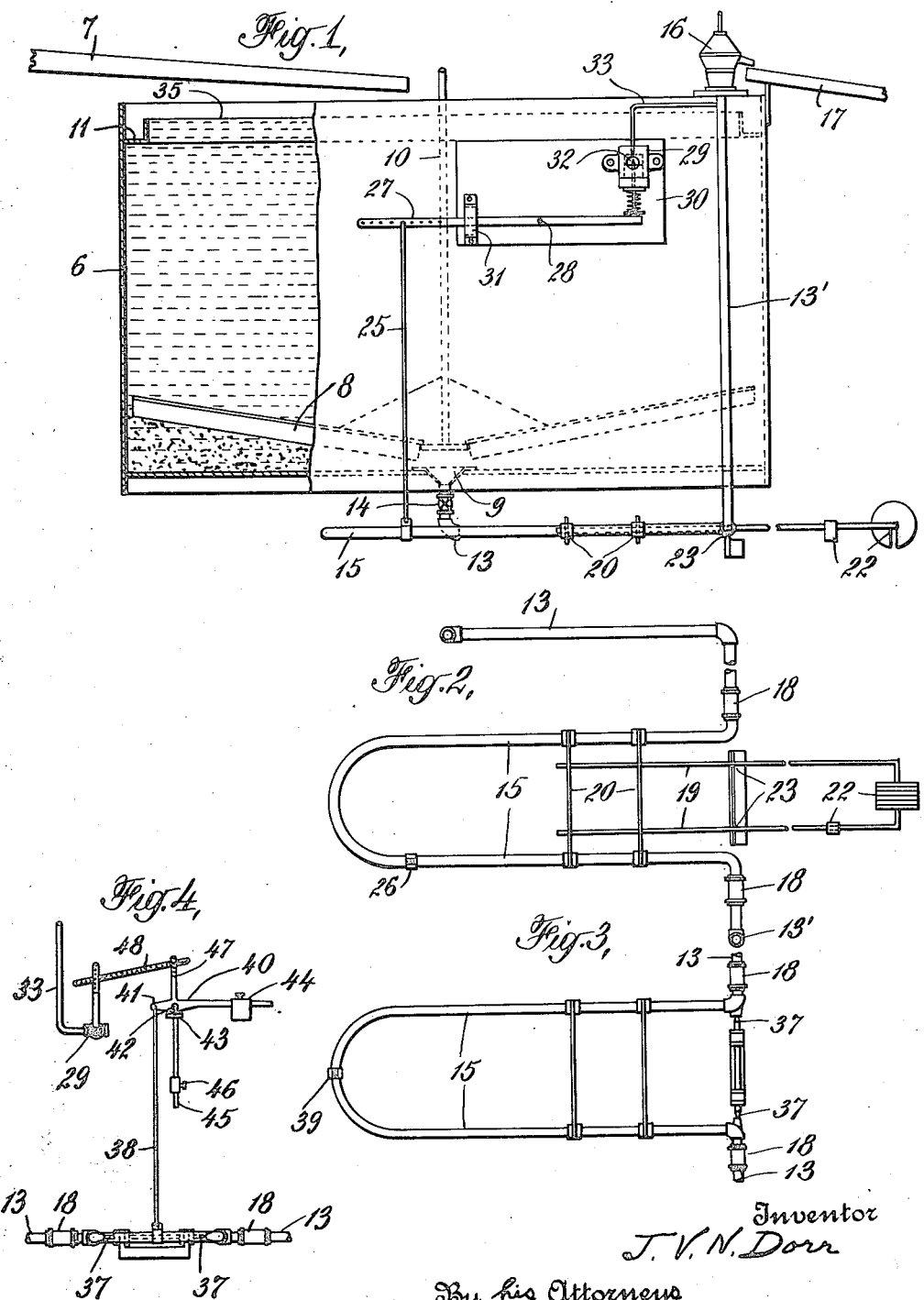

1,518,136

UNITED STATES PATENT OFFICE.

JOHN V. N. DORR, OF NEW CANAAN, CONNECTICUT, ASSIGNOR TO THE DORR COMPANY, OF NEW YORK, N. Y., A CORPORATION OF DELAWARE.

AUTOMATIC DENSITY CONTROL FOR THICKENERS.

Application filed April 25, 1922. Serial No. 556,479.

*To all whom it may concern:*

Be it known that I, JOHN V. N. DORR, a citizen of the United States, residing at New Canaan, in the county of Fairfield, State of Connecticut, have invented certain new and useful Improvements in Automatic Density Controls for Thickeners; and I do hereby declare the following to be a full, clear, and exact description of the invention, such as will enable others skilled in the art to which it appertains to make and use the same.

This invention relates to improved means for controlling the operation of decanting vessels or thickeners which are now widely used in industrial and metallurgical processes for the purpose of separating a greater or less proportion of the liquid from large quantities of liquids having finely divided solids in suspension. In such decanting vessels or thickeners, the solids are caused to settle in tanks and the clear, or relatively clear, liquid above is made to overflow from the settling tank, the settled solids being drawn or pumped through a suitable discharge orifice at the bottom of the vessel. Apparatus of this character is shown, for example, in my United States Patent No. 867,958 of October 15, 1907.

It is of great importance to provide for such apparatus an automatically acting control which can be closely regulated so that the overflow or underflow or both will be of uniform character, notwithstanding unavoidable variations in the nature of the material to be treated or its rate of feed to the thickener. In fact, in many applications, the overall efficiency of the apparatus is directly dependent upon the closeness of the control. In another prior patent granted to me on May 18, 1915, No. 1,140,131, I have disclosed means for automatically regulating the discharge of the underflowing material, or the inflow of the material to be thickened, for the purpose of maintaining constant conditions in the underflow or the overflow, or in both, and the present invention is more particularly concerned with the improvement of the method and apparatus for maintaining these conditions constant and especially for maintaining constant the density of the underflow.

In that patent a hydrometer or float is inserted in the settling vessel, and through suitable electrical devices controls the opening and closing of a valve in either the discharge conduit or the supply conduit of the vessel. Control is thus effected in response to the changes in density of the material under treatment. Apparatus constructed in accordance with this patent has proven successful and operative in commercial practice. However, the apparatus constructed in accordance with the present invention is more efficient, and gives more reliable and convenient regulation because the hydrometer is dispensed with and there is, therefore, no opportunity for the action of the hydrometer to be influenced by the motion of the liquid in the settling vessel and thus affect the accuracy of the apparatus. Nor is there any opportunity for material to deposit on the hydrometer from this liquid, which also affects the accuracy of the apparatus.

According to the present invention the density control, which may be in response to the varying density of either the underflow or the overflow, although the underflow is preferred, is effected by passing the underflow or the overflow, as the case may be, from the settling vessel through a section of conduit which is flexibly inserted in a pipe line for the discharge of the settling vessel and is so arranged that this section is continually weighed. If the density of the material passing through this section varies, the weight of the section will vary and its balance or equilibrium will be disturbed. Any such disturbance of the balance of the section is caused to control or regulate the rate of discharge or the rate of supply.

By the employment of a conduit section, the varying weight and consequently varying motion of which is caused to regulate the rate of discharge or the rate of supply, the opportunity for evaporation and consequent deposit of solids on the hydrometer is eliminated, since the interior surfaces of the conduit section are subjected only to a rapid flow of the liquid under conditions where evaporation does not take place, as contrasted with the hydrometer which is subject to the deposits caused by the evaporation of the liquid in an open vessel.

These and other features of the invention will be better understood by referring to the description which follows taken in connection with the accompanying drawings. In this description and illustration, I have disclosed an arrangement in which the flexible conduit section is in the underflow pipe line and controls the rate of discharge of the underflow, but it will be understood that it might equally well control the rate of inflow to the settling tank as in my earlier Patent No. 1,140,131, and it will also be understood that in certain cases it may be advisable to cause the overflow discharge instead of the underflow discharge to pass through the flexible pipe section.

In these drawings:

Fig. 1 is a view in elevation of the thickener and its discharge control apparatus;

Fig. 2 is a plan view of the conduit weighing apparatus for controlling the density of the underflow; and Figs. 3 and 4, are, respectively, a plan view and an elevation of a modification.

Referring to the drawings reference numeral 6 indicates a thickener or settling vessel which is continuously supplied with material to be treated through the supply conduit 7. 8 represents a slowly moving sweep rotated by the shaft 10 for keeping the solids in suspension and for moving the settled material toward the discharge orifice 9. The operation of separating relatively clear liquid or solution from the solid material may be performed in the usual way, the thickened material continuously and slowly passing through the discharge orifice 9, and the clear, or relatively clear, liquid or solution continuously and slowly overflowing into the launder or trough 11 and passing therefrom to any suitable receptacle.

A discharge pipe or conduit 13 is connected to the orifice 9 through the hand valve 14 and leads through the movable section or U pipe 15 (see Fig. 2) to the vertical section 13' of the discharge conduit and thence to the pump 16 from which it is discharged into the trough 17. The movable section 15 is connected to the discharge conduit 13 by means of the flexible connections 18 which may be of rubber hose, or other suitable material.

Supporting members 19 for the U pipe 15 are secured thereto near one end by means of the clamps 20. Members 19 are connected together at their opposite ends and are adapted to receive the weights 22. The whole movable structure comprising conduit 15, members 19 and weights 22, is supported upon the knife edges 23 in such manner as to be freely movable in the vertical direction.

Near the outer end of the U pipe 15 a rod 25 is attached by means of clamp 26. Rod 25 at its upper end is adjustably attached to lever 27. pivoted at 28, which actuates the valve 29 mounted upon a suitable panel 30. In order to keep the movement of the U pipe within suitable vertical limits the lever 27 passes behind the cleat 31 which is also attached to panel 30. Valve 29 is designed to admit air through the opening 32 to the pipe 33 and thence to the suction pipe of the pump 16. The admission of air to the suction pipe of the pump is used to control, in a well known manner, the output of the pump.

In the particular embodiment of the invention shown, the pump 16 is of the Dorrco or diaphragm type, but the underflow may be caused to discharge from the thickener 6 by any other suitable means.

In operation the underflow or sludge settling in the vessel 6 is pumped by the pump 16 through the discharge conduit 13, the movable section 15, the upright section 13' of the discharge pipe, through pump 16 and into trough 17 where it is carried into another vessel for further treatment. The weights 22 having been adjusted for the density of the underflow which it is desired to maintain, as long as the underflow which is passing through the movable section 15 remains at approximately the density required the whole movable structure will remain in equilibrium. If, however, the density of the sludge should rise by reason, for example, of the discharge from the thickener being too slow, or of variation in the density of the supply, the equilibrium of the movable structure will be disturbed, the movable section 15 moving in a downward direction. This movement will be transmitted to the valve 29 which will be closed slightly so as to admit less air to the intake of the pump 16, thereby increasing the output of the pump. The flow of the settled material will thereby be increased, thus increasing the amount of liquid discharged with the settled material and decreasing the density of the underflow. When this has again reached the value for which the weights 22 have been adjusted the U pipe will assume its normal position. If the density of the sludge should for any reason become too low the reverse of the above operation will take place.

It will also be seen that in changing the rate of discharge of the underflow as above described the density of the entire contents of the vessel 6 will be controlled. By close regulation the depth of the clear, or relatively clear, supernatant liquid may be maintained shallow, that is, the thickener may be so operated that the clear liquid will not extend for a very great distance below the overflow surface 35 of the thickener, thus operating the thickener at its maximum capacity.

In the modification shown in Figs. 3 and 4 the movable conduit section or U pipe 15 is supported at one end upon the bearings 37 which are designed to have as little friction as possible and at its other end by means of rod 38 which is attached to the U pipe 15 at 39. The rod 38 is attached to the beam 40 at 41. This beam 40 is supported by the knife edges 42 which rest upon the support 43. The beam 40 is provided with the weight 44 which corresponds to the weights 22 of Fig. 2, and is also provided with a vertically depending rod 45 upon which is mounted the adjustable weight 46, this weight being provided for adjusting the sensitiveness of the apparatus. Beam 40 is further provided with a vertically extending lever 47 which, through the adjustable link 48 actuates the lever of air valve 29 which is located in the pipe 33 as before and controls the capacity or output of the sludge pump 16. This arrangement of the apparatus reduces considerably the weight carried by the knife edges.

By means of the weights 22 of Fig. 2, and the weight 44 of Fig. 4, the automatic density control apparatus may be set so as to hold within certain limits the density of the underflow at any desired value, for example, if it was desired to maintain the underflow constant at 50% solids whereby the specific gravity of the underflow would be relatively high, the weights 22 would have to be relatively heavy, or weight 44 shifted toward the outer end of the beam, whereas if it is desired to hold the underflow at a density of only 40% solids and having a lower specific gravity, the apparatus can be instantaneously adjusted for this change in density by simply moving the weights 22, or the weight 44.

In installing this automatic density control apparatus it is, of course, necessary to take into account the local conditions. In some plants it will be necessary on account of space requirements to install the U pipe above the level of the bottom of the thickener and the apparatus as shown in Figs. 1 and 2, or as shown in Figs. 3 and 4, may be used, or any other modification which will best suit the requirements of the particular installation.

By utilizing a flexible conduit section, arranged so that its equilibrium is changed in accordance with changes in density of the material flowing through it, the moisture content of the underflow from a thickener may be automatically regulated to within 1% of the desired value. This accuracy may be maintained continuously in commercial applications and with practically no attention required.

In the claims which follow, by the word thickener it is intended to include any apparatus by which settling solids are separated from a portion of the liquid in which they are suspended or by which relatively quickly settling solids, together with a portion of the liquid, are separated from the more slowly settling solids and a portion of the liquid.

I claim:

1. Control apparatus for thickeners comprising a movable conduit section through which a discharge from the thickener flows, in combination with control devices associated with the conduit section and actuated by the movement of the conduit section resulting from changes in density of the stream of discharged material.

2. The combination with a thickener provided with a discharge conduit, of a conduit section flexibly connected to said discharge conduit and supported so as to change its equilibrium in accordance with changes in the weight of the discharged material flowing therethrough, and means actuated by a change in equilibrium of said section for regulating the discharge of settled material.

3. The combination with a thickener, and a conduit for the thickened material discharged therefrom, of a section in said conduit movable in response to changes in density of said material, and means associated with said movable section for controlling the flow of thickened material through the conduit.

4. The combination with a thickener, of a section of conduit movable under the influence of gravity, means for pumping discharged material from the thickener through said section and means operated by the motion of said section for controlling the pumping means.

5. A thickener having a flexible conduit section adapted to vary its position in accordance with the varying weight of the underflow passing therethrough, and mechanism operatively connected to said flexible conduit section for controlling the discharge of the underflow.

6. A thickener, a discharge conduit therefor, a flexible section in said conduit adapted to be altered in position by the varying weight of the material flowing therethrough, and means actuated by the movement of said section to vary the rate of flow of the material in the conduit.

7. Apparatus comprising a settling vessel, a discharge conduit for the overflow, a discharge conduit for the underflow, a movably supported section flexibly connected to the underflow discharge conduit, means for balancing the weight of said section and means actuated by said section for controlling the rate of discharge of the underflow in accordance with the varying weight of the underflow in said section.

8. The method of controlling the density of the underflow in a machine of the character described which consists in passing discharged material through a movable conduit section and utilizing the movement of the section caused by the varying weight thereof to regulate the rate of discharge of the underflow.

9. The method of continuously and automatically separating a fluid containing suspended solids into two products, one of which shall have a constant density, which method consists in feeding the fluid into a settling vessel and causing variations in the specific gravity of a discharge therefrom to automatically regulate the rate of discharge.

10. A thickener, having a discharge conduit for the underflow, a movably supported conduit section flexibly connected to the discharge conduit, a beam having adjustable weights thereon for balancing said conduit section, a pump connected to move the underflow through said conduit section, an air inlet valve for said pump for varying its capacity, and means operated by said conduit section for actuating the air valve.

11. Control apparatus for thickeners, comprising a movable pipe section through which a discharge from the thickener flows, in combination with control devices associated with the pipe section and actuated by the movement of the pipe section resulting from changes in density of the stream of discharged material.

In testimony whereof I affix my signature.

JOHN V. N. DORR.